United States Patent
Hancock

(10) Patent No.: US 7,456,851 B2
(45) Date of Patent: Nov. 25, 2008

(54) METHOD AND APPARATUS FOR SPATIAL COMPENSATION FOR PIXEL PATTERN ON LCD DISPLAYS

(75) Inventor: William R Hancock, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 907 days.

(21) Appl. No.: 10/847,710

(22) Filed: May 18, 2004

(65) Prior Publication Data

US 2004/0233230 A1 Nov. 25, 2004

Related U.S. Application Data

(60) Provisional application No. 60/472,335, filed on May 20, 2003.

(51) Int. Cl.
*G09G 5/10* (2006.01)
(52) U.S. Cl. ...................... 345/690; 345/696
(58) Field of Classification Search ........... 345/87–100, 345/204, 690–698, 699; 382/162–167; 358/1.8, 358/515, 518
See application file for complete search history.

(56) References Cited

U.S. PATENT DOCUMENTS

| | | | |
|---|---|---|---|
| 5,339,092 A | 8/1994 | Johnson et al. | 345/611 |
| 6,348,929 B1 * | 2/2002 | Acharya et al. | 345/660 |
| 6,753,858 B2 * | 6/2004 | Asai et al. | 345/419 |
| 6,782,129 B1 * | 8/2004 | Li et al. | 382/176 |
| 7,102,650 B2 * | 9/2006 | Okada et al. | 345/615 |
| 7,148,901 B2 * | 12/2006 | Belmon et al. | 345/589 |
| 2006/0098128 A1 * | 5/2006 | Conner et al. | 349/5 |

* cited by examiner

*Primary Examiner*—Nitin Patel
(74) *Attorney, Agent, or Firm*—Ingrassia, Fisher & Lorenz, P.C.

(57) ABSTRACT

An apparatus and method for providing color dot signals of an image for an active matrix display. The apparatus includes a graphic generator that provides an image input to a graphical processing unit. The graphic generator also control the graphical processing unit to form a plurality of sub-images of the image, where the sub-images represent different color dots of a plurality of pixels of the display. A composite image processor includes a color mask that filters the sub-images based on a predetermined color dot topology of the pixels and interleaves the filtered sub-images to form the color dot signals in appropriate positions in a row of pixels based on the topology. The apparatus provides enhanced resolution as well as permits the use of off shelf components for the graphical processing unit.

11 Claims, 5 Drawing Sheets

METHOD AND APPARATUS FOR SPATIAL COMPENSATION FOR PIXEL PATTERN ON LCD DISPLAYS

CROSS REFERENCE TO RELATED APPLICATION

This application claims the benefit of U.S. provisional application No. 60/472,335, filed on May 20, 2003, the entire contents of which are incorporated herein by reference.

FIELD OF THE INVENTION

This invention relates to a method and apparatus for forming high resolution images.

BACKGROUND OF THE INVENTION

Low resolution LCD displays benefit from driving individual color dots instead of color groups. To remove undesired artifacts, the image is multi-sampled at each dot. The sample values are then combined (e.g., averaged) to form a final dot value. In such systems, the multi-sampling results in plural images, each having a certain dot resolution. The dot combining technique results in a final image having the same certain dot resolution with the artifacts eliminated or substantially reduced. This technique involves special circuitry to shift the data of the image to the desired sample points.

A graphic processing unit (GPU) constructed with commercial off the shelf (COTS) chips provides the special circuitry needed for multi-sampling. The COTS GPU is normally controlled to do multisampling and sampled image combination as described above. However, the COTS GPU only supports concentric color dot groups. This has limited the effectiveness of using COTS GPU in low resolution LCD display applications.

A problem for solution is how to achieve artifact-free high resolution images by driving all the color dots on the display independently.

SUMMARY OF THE INVENTION

The aforementioned problem is solved by the present invention by offsetting the images according to color by employing a COTS GPU. The COTS GPU is controlled with pixel centering offsets for each color dot of the pixel to provide a sub-image for each color. Instead of merging the sub-images, all of the sub-images are scanned in the desired pattern of the display to read individual color dot values. This results in a composite image having a resolution that is higher than that of the sub-images.

An embodiment of the method of the present invention provides color dot signals of an image for an active matrix display by performing the steps of providing an image input to a graphical processing unit, controlling the graphical processing unit to form a plurality of sub-images of the image and deriving the color dot signals from the sub-images.

In another embodiment of the method of the present invention, the active matrix display is a liquid crystal display.

In another embodiment of the method of the present invention, one or more of the sub-images represent different color dots of a plurality of pixels of the active matrix display.

In another embodiment of the method of the present invention, the step of deriving comprises the steps of: color filtering the sub-images based on a predetermined pixel color dot topology and interleaving the filtered sub-images so as to form the color dot signals in appropriate positions in a row of the pixels based on the topology.

In another embodiment of the method of the present invention, the graphical processing unit provides an output in which the sub-images are interleaved by row. The deriving step de-interlaces the sub-image rows.

In another embodiment of the method of the present invention, the pixels have a color dot topology selected from the group consisting of: quad, delta and red, green and blue (RGB) stripe.

In an embodiment of the apparatus of the present invention, a graphic generator provides an image input to a graphical processing unit and also controls the graphical processing unit to form a plurality of sub-images of the image. A composite image processor derives the color dot signals from the sub-images.

In another embodiment of the apparatus of the present invention, the active matrix display is a liquid crystal display In another embodiment of the apparatus of the present invention, one or more of the sub-images represent different color dots of a plurality of pixels of the active matrix display.

In another embodiment of the apparatus of the present invention, the graphical processing unit provides an output in which the sub-images are interleaved by row, and wherein the controller de-interlaces the sub-images rows.

In another embodiment of the apparatus of the present invention, the pixels have a color dot topology selected from the group consisting of: quad, delta and red, green and blue (RGB) stripe.

In another embodiment of the apparatus of the present invention, the composite image processor comprises a color mask device that color filters the sub-images based on a predetermined pixel color dot topology and interleaves the filtered sub-images so as to form the color dot signals in appropriate positions in a row of the pixels based on the topology.

In another embodiment of the apparatus of the present invention, the composite image processor places the color filter images in one or more buffers and reads the buffers on a dot interleaved basis to form the color dot signals.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE PREFERRED EMBODIMENT

Figure 1:
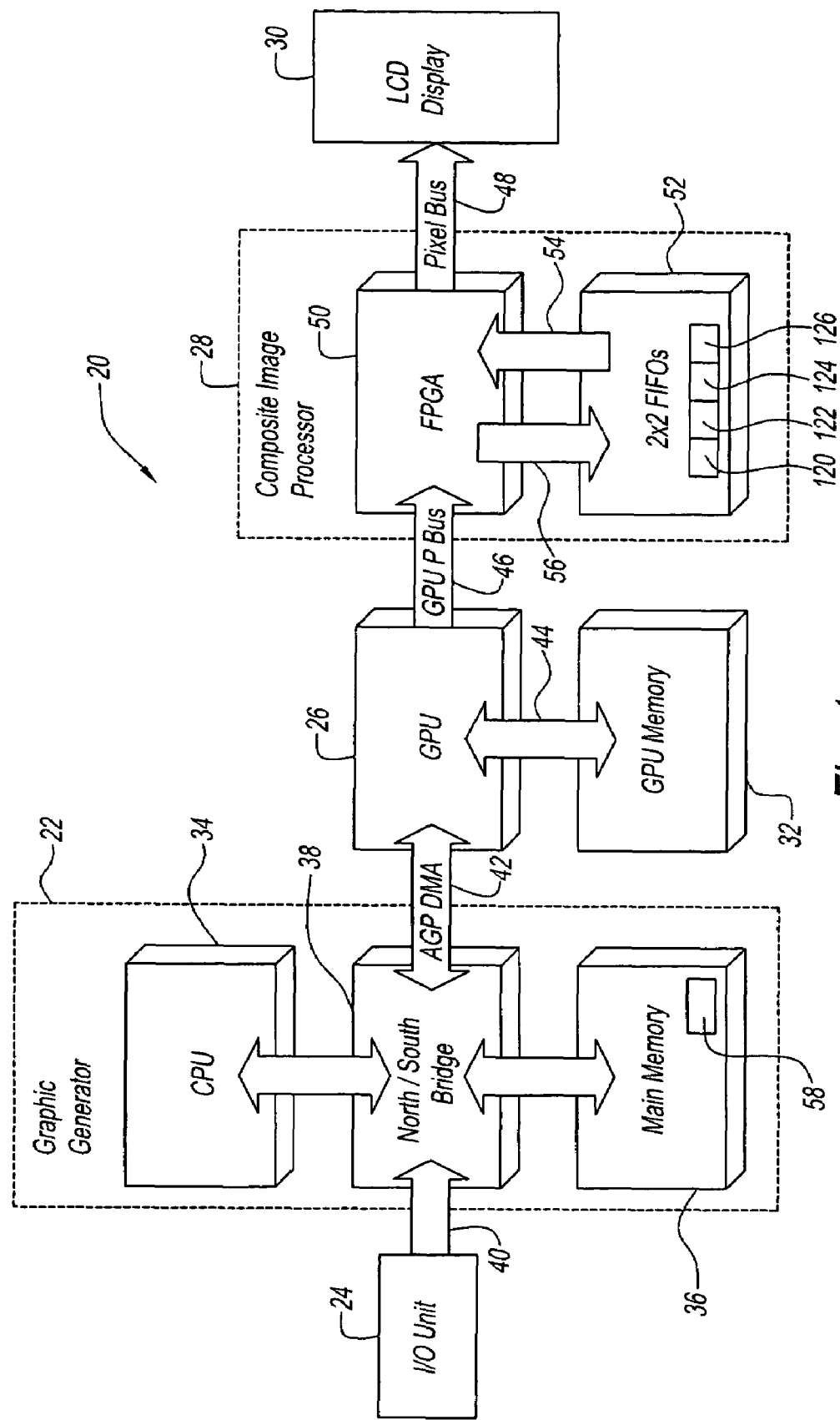
FIG. 1 is a block diagram of a display system of the present invention.

Referring to FIG. 1, an embodiment of a display system 20 of the present invention includes a graphic generator 22, an input/output (I/O) unit 24, a graphical processing unit (GPU) 26, a composite image processor 28 and a liquid crystal display (LCD) display 50. Display system 20, for example, may be used in applications where operators of complex machinery require a reliable, high-quality visual feedback mechanism. For example, a pilot of a modern jet airliner generally has to tradeoff the costs of a high resolution display with the safety of being able to interpret the data being presented.

I/O unit 24 may include one or more I/O devices, such as a keyboard, a mouse, a system data bus or special data buses that have the capability to input graphical and/or textual command data for an image. The image data is converted by graphical generator 22 into a structure of data and commands for controlling the GPU 26. GPU 26 responds to the commands to form the data into a plurality of sub-images. Composite image processor 28 processes the sub-image data into a composite image that is used to drive the individual color dots of LCD display 30.

Figure 2:
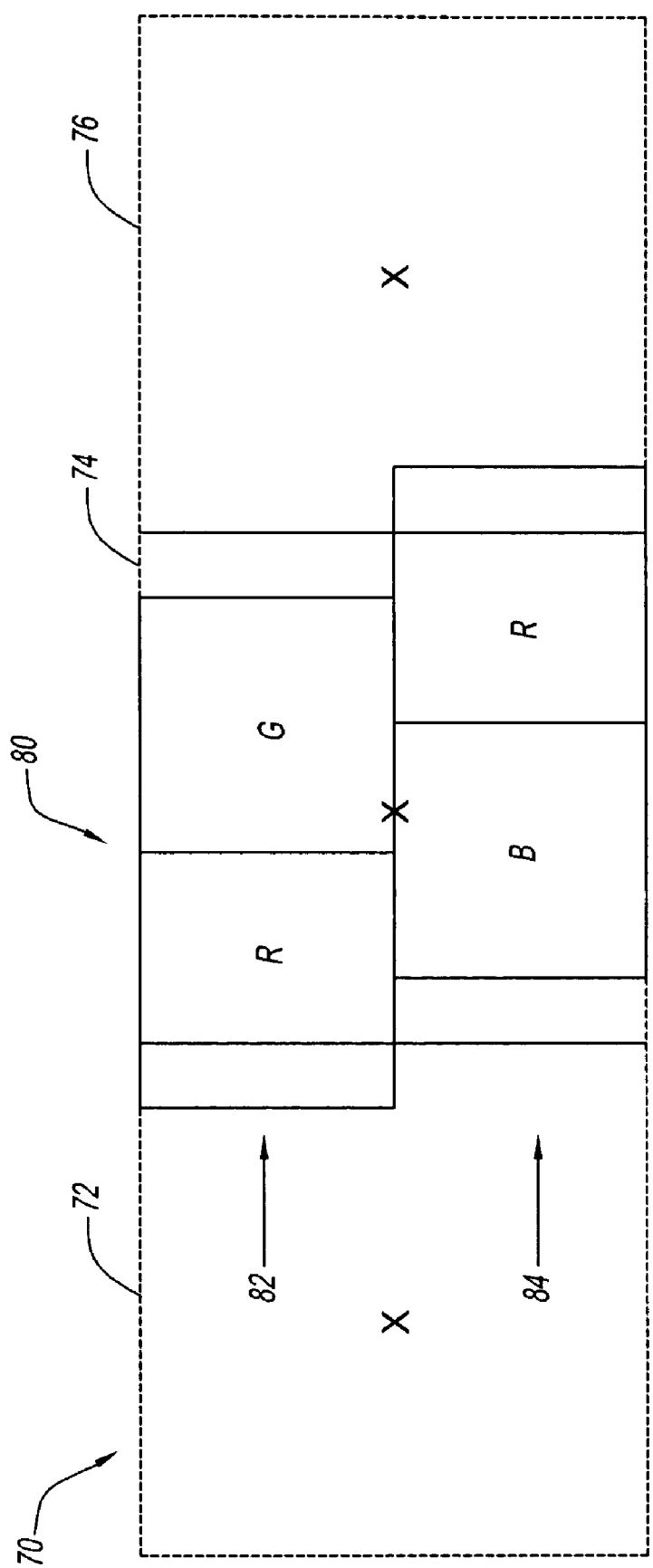
FIG. 2 depicts a pixel example that is useable with the display system of FIG. 1.

Display system 20 may be used with any desired color dot topology of a pixel, such as quad, delta, RGB stripe and the like. By way of example, display system 20 will be described herein for a delta topology, which, as described herein, is like the quad topology (four color dots per pixel) but arranged in a "delta" pattern (due to ½ pixel delta offset between even and odd rows). Referring to FIG. 2, a pixel row 70 of three pixels 72, 74 and 76 is shown, each with a center marked by X. Middle pixel 74 is shown with a delta color dot topology 80 that has an upper dot row 82 of a red (R) dot and a green (G) dot, side by side, and a lower dot row 84 of a blue (B) dot and a red dot, side by side. Topology 80 is such that upper dot row 82 and lower dot row 84 are offset from one another by 0.5 pixel and offset from the center X by 0.25 pixel.

According to the present invention, the image to be rendered is offset according to color dot location relative to the pixel center X. Thus, the image is rendered four times: once for the first red offset, once with the green offset, once with the blue offset and once with the second red offset. Display system 20 uses standard full scene anti-aliasing (FSAA) capability of GPU 20 in a non-standard manner to achieve the four sub-images in a single pass. Instead of having the hardware merge the sub-images (the standard way), all sub-images are scanned out in the desired pattern of LCD display 30 to read individual color dot values. This results in full micro-positioning of each color dot for anti-aliasing as well as a composite image having twice the resolution of the individual sub-images.

Figure 3:
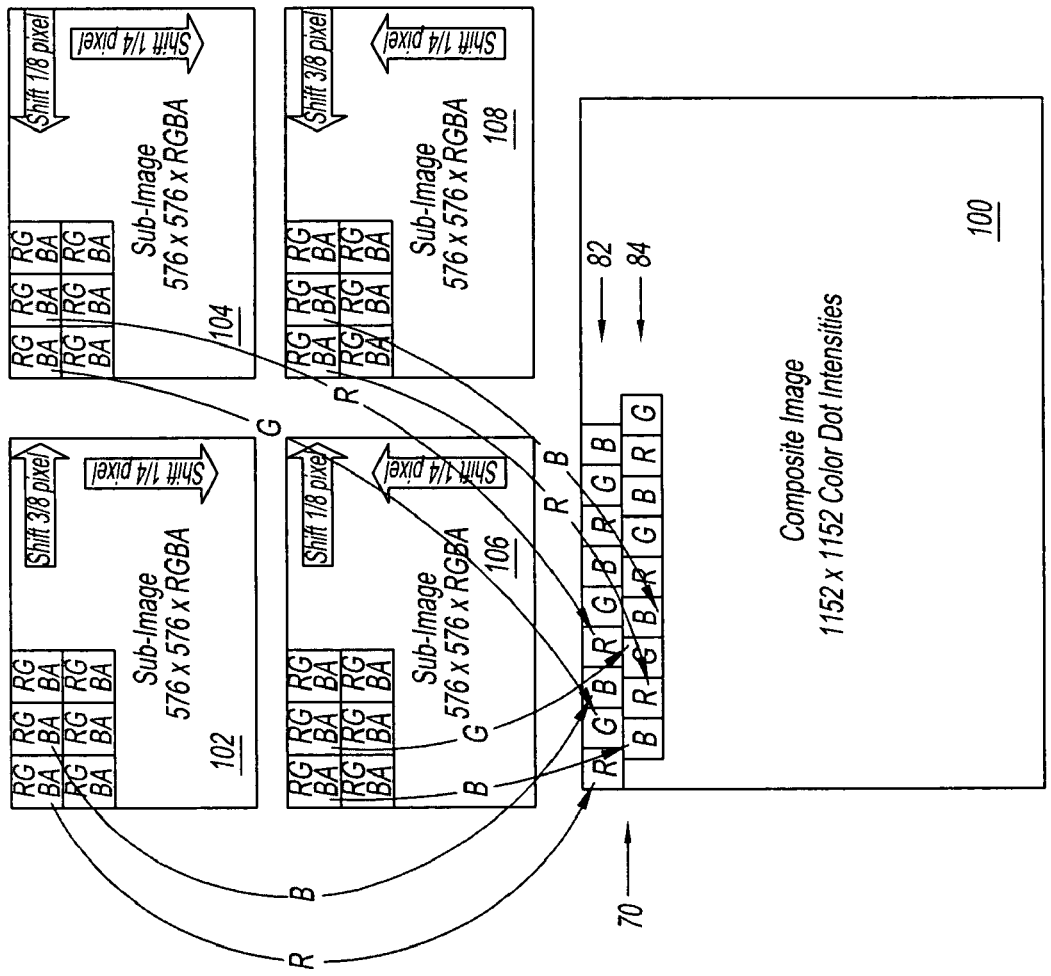
FIG. 3 depicts sub-images and a composite image formed by the display system of FIG. 1.

Referring to FIG. 3, pixel row 70 is shown as the top row of a composite image 100 that has a plurality of pixel rows. The pixels in each row have a color dot sequence that repeats in sets of three pixels. Thus, the first pixel (leftmost pixel) of pixel row 70 includes color dots R and G of color dot row 82 and color dots B and R of color dot row 84, the second pixel includes color dots B and R of color dot row 82 and color dots G and B of color dot row 84, and the third pixel includes color dots G and B of color dot row 82 and color dots R and G of color dot row 84. The fourth pixel begins a new pixel set in the sequence.

GPU 20 forms four sub-images 102, 104, 106 and 108 of the image data in a single pass. Sub-image 102 has a sampling point that is centered in the upper left color dot of each pixel. This requires that the image data be shifted by the offset shown in sub-image 102, namely, ⅜ pixel right and ¼ pixel down. Sub-image 104 has a sampling point that is centered in the upper right color dot of each pixel. This requires that the image data be shifted by the offset shown in sub-image 104, namely, ⅛ pixel left and ¼ pixel down. Sub-image 106 has a sampling point that is centered in the lower left color dot of each pixel. This requires that the image data be shifted by the offset shown in sub-image 106, namely, ⅛ pixel right and ¼ pixel up. Sub-image 108 has a sampling point that is centered in the lower right color dot of each pixel. This requires that the image data be shifted by the offset shown in sub-image 108, namely, ⅜ pixel left and ¼ pixel up.

Composite image 100 and sub-images 102, 104, 106 and 108 are shown with an array size for a specific example in which the color dot resolution is 576×576 for each sub-image and 1152×1152 for the composite image 100. Thus, composite image 100 has twice the resolution of any one of the sub-images 102, 104, 106 or 108. It will be appreciated that other resolutions are possible for the delta color dot topology example, as well as for other color dot topologies.

Assuming that the topmost row is row 0 and the row just beneath is row 1, composite image processor 28 forms composite image 100 by interleaving sub-images 102 and 104 to form the even dot rows and interleaving sub-images 106 and 108 to form the odd dot rows of composite image 100. Thus, odd dot row 82 comprises (from left to right) a red dot from sub-image 102, a green dot from sub-image 104, a blue dot from sub-image 102, a red dot from sub-image 104 and so on. Thus, even dot row 84 comprises (from left to right) a blue dot from sub-image 106, a red dot from sub-image 108, a green dot from sub-image 106, a blue dot from sub-image 108 and so on.

Referring again to FIG. 1, graphic generator 22 includes a central processing unit (CPU) 34 and a main memory 36. A memory arbitrator (such as the North/South bridge 38) interconnects CPU 34, main memory 36 with I/O unit 24 via an I/O bus 40 and with GPU 26 via a DMA bus 42. CPU 34 is operable to run any suitable graphic program to provide drawing commands to GPU 26 based on input data provided by the I/O unit. For example, a drawing command may instruct GPU 26 to draw a line based on coordinate data stored, beginning at a specific starting address, in main memory 36. GPU 26 then executes the commands by accessing main memory 36 beginning at the specific address. Equivalently, the CPU can write these commands directly to the GPU for systems that do not support DMA.

CPU 34 also executes a procedure 58, which may be stored in main memory 36, to issue one or more control commands to GPU 26 to generate a plurality of sub-images of the drawing data, each having a specific offset from the pixel center. For the delta example, the number of images would be four and the offsets would be those shown in FIG. 3 and described above.

North/South bridge 38 provides control of direct memory access to main memory 36 by CPU 34, I/O unit 24 and GPU 26 in accord with an access policy.

GPU 26 executes the drawing commands based on the control commands to draw the image using multi-sampling to generate four sub-images 102, 104, 106 and 108. That is, GPU 20 provides for each color dot of each sub-image a value that is proportional to the color intensity at the sample point. In the aforementioned example, each sub-image would be an array 576×576 color dots or values. GPU 26 provides via a GPU bus 44 the sub-image values to a GPU memory 32 for storage in a buffer (not shown). GPU 20 executes a procedure to read the dot values from the buffer, one dot row at a time, and provide the dot values to composite image processor 28 via a GPU PBus 46.

GPU 26 may be any suitable graphics processing unit. Preferably, GPU 26 is programmable with set-up parameters as to number of images, offsets and the like. For example, GPU 26 may be constructed with COTS chips, which are available as model no. P10 from 3DLabs or the Radeon 9800 from ATI technologies.

Composite image processor 28 forms the data of sub-images 102, 104, 106 and 108 received from GPU 26 into composite image 100. To this end, composite image processor 28 includes a controller, such as a field programmable array (FPGA) 50, and a first in first out (FIFO) buffer group 52. For the delta or quad example, FIFO buffer group 52 includes four FIFO buffers 120, 122, 124 and 126.

Figure 4:
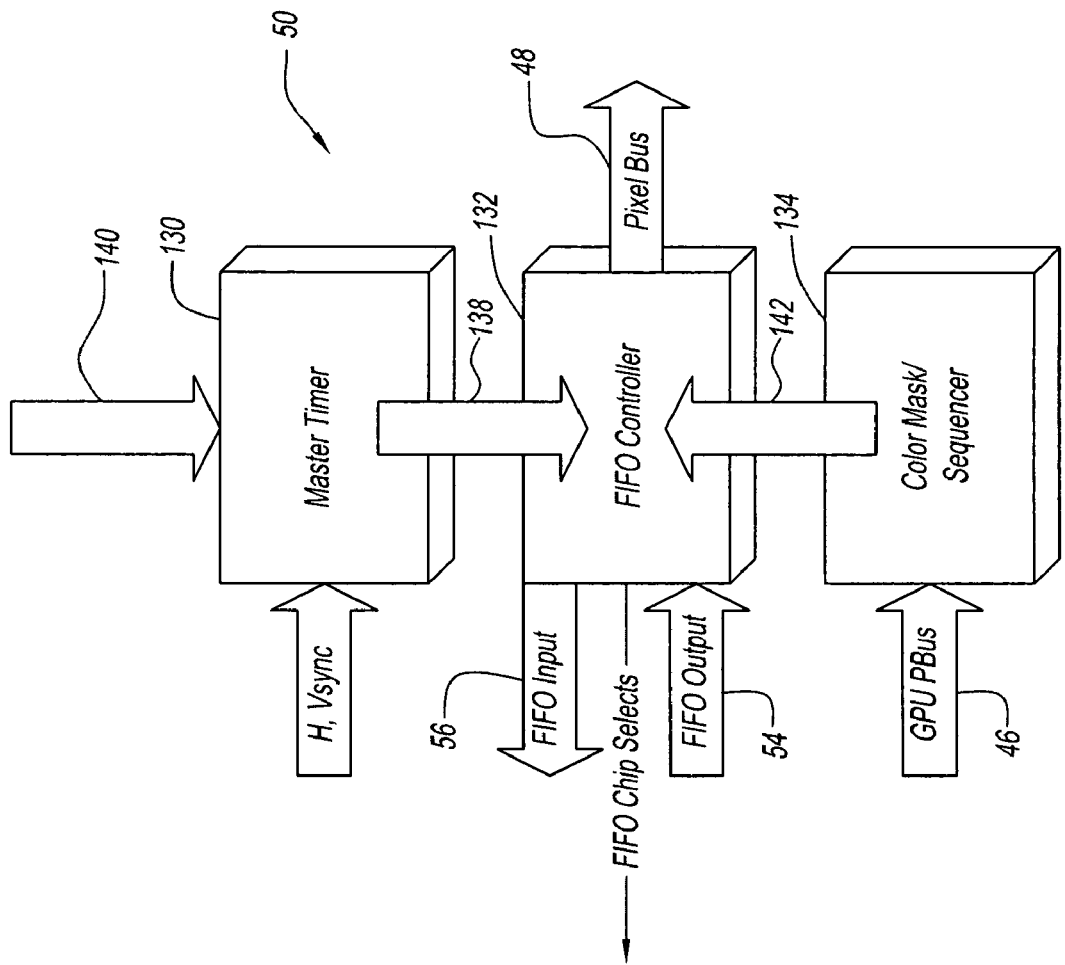
FIG. 4 is a block diagram of the field programmable array controller of the apparatus of FIG. 1.

Referring to FIG. 4, FPGA 50 includes a master timer 130, a FIFO controller 132 and a color mask sequencer 134. Master timer 130 is controlled by the horizontal and vertical synchronization timing of LCD display 30 to provide timing signals via a timing bus 138 that control FIFO controller 132 to provide pixel data one dot row at a time over pixel bus 48. A pixel clock signal received via a pixel clock bus 140 controls master timer 130 to assure that the dot signals are provided at the appropriate dot rate during a scan line time.

For the delta pattern example, color mask sequencer 134 filters the data of sub-image 102 with a color mask RBG, the data of sub-image 104 with a color mask GRB, the data of sub-image 106 with a color mask BGR and the data of sub-image 108 with a color mask RGB.

FIFO controller 132 is configured to route during a first scan line time via a FIFO input bus 56 an even row, e.g., row 0, from sub-images 102 and 104 to FIFO buffers 120 and 122, respectively, and then an odd row, e.g., row 1, from row 0 of sub-images 106 and 108 to FIFO buffers 124 and 126, respectively. FIFO controller 132 is further configured to read FIFO buffers 102 and 104 on a dot interleaved basis while FIFO buffers 106 and 108 are being filled. This results in an even row 0 of RGB dot sequence signal on FIFO output bus 54, which FIFO controller 132 places on pixel bus 48. During the scan time for a second scan line, FIFO controller 132 reads FIFO buffers 106 and 108 on a dot interleaved basis while FIFO buffers 102 and 104 are being filled with the next even row and so on. This read out method will result in the desired RGB pattern across even rows and the desired BRG pattern across odd rows.

Considering the exemplary resolution of 1152×1152 dots of LCD display 30, each FIFO buffer 102, 104, 106 and 108 will be filled with 576 dots and each interleaved even or odd row will have 1152 dots. In this example, the readout mechanism is achieved by copying each of the four multi-sample sub-images into a single 2304×576 readout memory. The GPU 26 is configured to drive a single 2304×576 buffer. External logic (FPGA 50) then de-interlaces the four sub-images from the single readout buffer to drive the composite image with independent control of each color dot.

Figure 5:
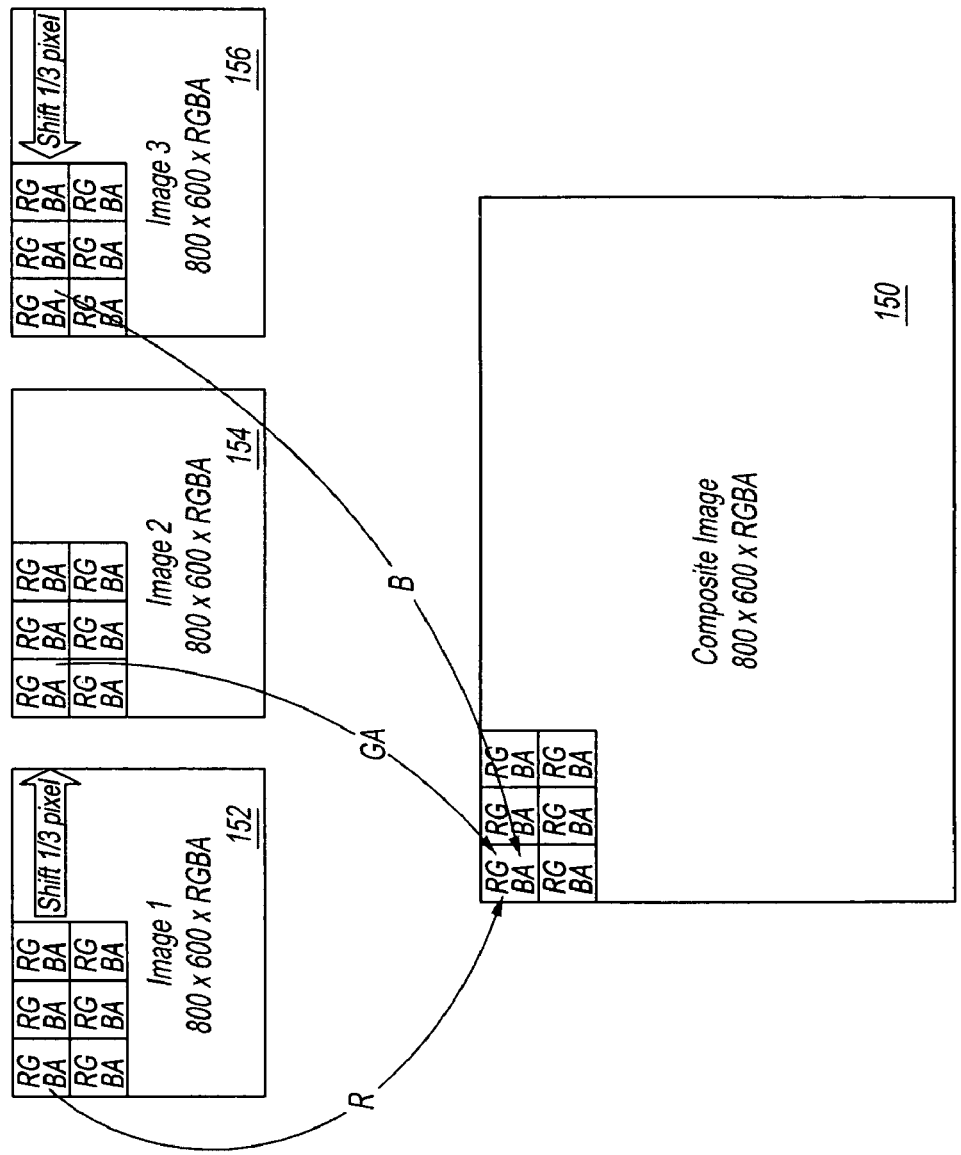
FIG. 5 depicts another pixel example that is useable with the apparatus of FIG. 1.

As noted above, display system 20 can be set up to handle color dot topologies other than quad or delta, which each require four sub-images. Referring to FIG. 5, a composite image 150 is formed from three sub-images for a color dot topology of an RGB stripe. The first sub-image 152 is offset one third of a pixel to the left, the second sub-image 154 is not offset and the third sub-image 156 is offset one third of a pixel to the right. This reflects the standard configuration for stripe displays or red, green, blue arranged in vertical stripes (red stripe to left, green stripe in middle, blue stripe to right side of each pixel). The composite image 150 then is formed by taking the red component from sub-image 152, the green components from sub-image 154 and the blue component from sub-image 156. If alpha is desired, then it will typically be extracted from the center pixel. This results in each color dot being driven independently rather than as a concentric pixel group. In this case, the resolution of the sub-images and the composite image is the same, but the composite image will have superior anti-aliasing because each color dot is optimally positioned during the rendering.

It will be apparent to those skilled in the art that the sub-images could be drawn a plurality of times, where only one color is rendered during each pass. Between passes, all coordinates are translated (for the RGB example) one third of a pixel so that the color rendering is aligned accurately with the individual color dots. Thus, the red sub-image would be translated one third pixel to the right, the green pixel is not translated and the blue pixel is translated one third pixel to the left. That is, the sub-images are translated in the opposite direction from the actual color dots to properly adjust the distances from the center. However, drawing the image in multiple passes may be disadvantageous. It is preferable to embed the pixel offsets into the rendering pipeline itself as described herein for the preferred embodiments. Thus, GPU 26 calculates the center position of the pixel and then adds the red and blue offsets to get the individual sub-pixel positions for each color. GPU 26 would then apply its normal mechanisms for full scene anti-aliasing to these three positions so as to allow the full benefits of multipass rendering with very little extra cost.

The present invention having been thus described with particular reference to the preferred forms thereof, it will be obvious that various changes and modifications may be made therein without departing from the spirit and scope of the present invention as defined in the appended claims.

What is claimed is:

1. A method for providing color dot signals of an image for an active matrix display comprising:
   providing an image input to a graphical processing unit;
   controlling said graphical processing unit to form a plurality of sub-images of said image, wherein one or more of said sub-images represent different color dots of a plurality of pixels of said active matrix display and are offset according to a location of the respective color dot relative to a center of the respective pixel; and
   deriving said color dot signals from said sub-images.

2. The method of claim 1, wherein said active matrix display is a liquid crystal display.

3. The method of claim 1, wherein said step of deriving comprises the steps of: color filtering said sub-images based on a predetermined pixel color dot topology and interleaving said filtered sub-images so as to form said color dot signals in appropriate positions in a row of said pixels based on said topology.

4. The method of claim 1, wherein said graphical processing unit provides an output in which said sub-images are interleaved by row, and wherein said deriving step de-interlaces said sub-image rows.

5. The method of claim 1, wherein said pixels have a color dot topology selected from the group consisting of: quad, delta and red, green and blue (RGB) stripe.

6. An apparatus for providing color dot signals of an image for an active matrix display comprising:
   a graphic generator that provides an image input to a graphical processing unit and that controls said graphical processing unit to form a plurality of sub-images of said image, wherein one or more of said sub-images represent different color dots of a plurality of pixels of said active matrix display and are offset according to a location of the respective color dot relative to a center of the respective pixel; and
   a composite image processor that derives said color dot signals from said sub-images.

7. The apparatus of claim 6, wherein said active matrix display is a liquid crystal display.

8. The apparatus of claim 6, wherein said graphical processing unit provides an output in which said sub-images are interleaved by row, and wherein said controller de-interlaces said sub-image rows.

9. The apparatus of claim 6, wherein said pixels have a color dot topology selected from the group consisting of: quad, delta and red, green and blue (RGB) stripe.

10. The apparatus of claim 6, wherein said composite image processor comprises a color mask device that color filters said sub-images based on a predetermined pixel color dot topology and interleaves said filtered sub-images so as to form said color dot signals in appropriate positions in a row of said pixels based on said topology.

11. The apparatus of claim 10, wherein said composite image processor places said color filter images in one or more buffers and reads said buffers on a dot interleaved basis to form said color dot signals.

* * * * *